United States Patent [19]

Woods et al.

[11] Patent Number: 5,137,291
[45] Date of Patent: Aug. 11, 1992

[54] REAR WHEEL STEERING ARRANGEMENT

[75] Inventors: Peter R. Woods; Alan D. Brunning, both of Chelmsford, Great Britain

[73] Assignee: Ford Motor Company, Dearborn, Mich.

[21] Appl. No.: 663,857
[22] PCT Filed: Sep. 15, 1989
[86] PCT No.: PCT/GB89/01085
 § 371 Date: Mar. 11, 1991
 § 102(e) Date: Mar. 11, 1991
[87] PCT Pub. No.: WO90/03296
 PCT Pub. Date: Apr. 5, 1990

[30] Foreign Application Priority Data

Sep. 23, 1988 [GB] United Kingdom ................ 8822411

[51] Int. Cl.⁵ .............................................. B62D 6/02
[52] U.S. Cl. ........................................ 280/91; 180/140
[58] Field of Search ........................... 280/91; 180/140

[56] References Cited

U.S. PATENT DOCUMENTS

| 4,505,491 | 3/1985 | Sano et al. | 280/91 |
| 4,787,645 | 1/1988 | Ohbayashi et al. | 280/91 |

FOREIGN PATENT DOCUMENTS

| 37362894 | 5/1988 | Fed. Rep. of Germany . |
| 60-174365 | 9/1985 | Japan . |
| 60-189676 | 9/1985 | Japan . |
| 2157242 | 10/1985 | United Kingdom . |
| 2202198 | 9/1988 | United Kingdom . |

Primary Examiner—Kenneth R. Rice
Attorney, Agent, or Firm—Raymond L. Coppiellie; Roger L. May

[57] ABSTRACT

A rear wheel steering arrangement for a motor vehicle having a pair of rear wheels connected to the vehicle by forward and rearward transverse suspension arms comprises a body member extending transversely between each of the rear wheels, the slide member mounted on the body member and being connected to an inboard end of each of the rearward suspension arms, and a steering mechanism having an input shaft and an output shaft. The output shaft is connected to the slide member and the steering mechanism drives the slide member axially along the transvrese member causing the rearward suspension arms to move in common with the slide member so as to produce a steering action on the rear wheels.

13 Claims, 7 Drawing Sheets

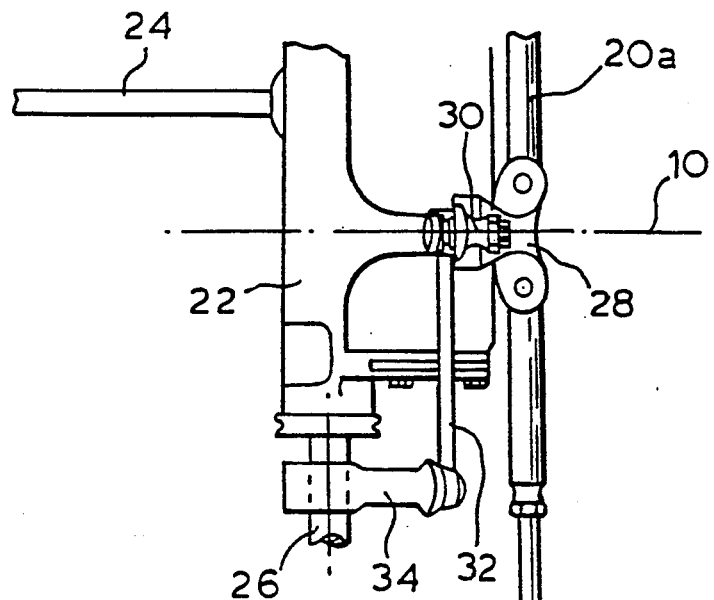
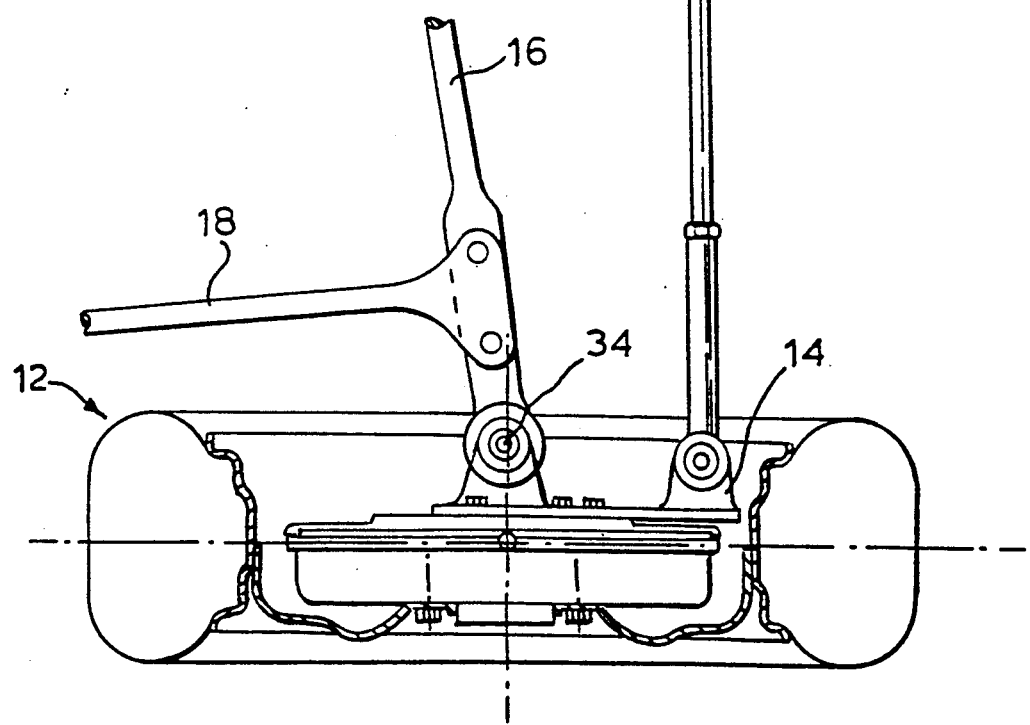
FIG.1.

REAR WHEEL STEERING ARRANGEMENT

BACKGROUND OF THE INVENTION

This invention relates to a rear wheel steering arrangement for a motor vehicle, and in particular to a steering arrangement where all four wheels of the car are steered.

Various designs of four wheel steering systems are known. In such systems, the front wheels are always the fundamental steering components, and turning of the front wheels is the major controlling factor on the steering of the vehicle. The rear wheels are steered to a lesser degree; at low speeds to assist in parking and manoeuvring and at high speeds to improve handling and stability of the vehicle. At low speeds it is conventional to turn the rear wheels in the same direction as the front wheels whilst at high speeds it is conventional to turn the rear wheels in the opposite sense to the front wheels.

These different requirements are accomplished in various different ways by known four wheel steering systems, but it is normally the case that the rear wheel suspension/drive/steering arrangement requires considerable modification as compared with a conventional vehicle with non-steered rear wheels. This leads to added complexity and cost, and may compromise the suspension layout.

SUMMARY OF THE INVENTION

According to the invention there is provided a rear wheel steering arrangement for a motor vehicle, the arrangement including a pair of rear wheels which are each connected to the vehicle by a forward and by a rearward transverse suspension arm, and a steering mechanism which has an input and an output, characterised in that the output of the steering mechanism is connected to a common actuator mounted on the vehicle so that movement of the steering mechanism output produces movement of the actuator on either side of the vehicle centreline, the inboard ends of two of the suspension arms, one on each side of the vehicle, being connected to the actuator so that they are moved transversely in common by the common actuator to produce a steering action on the rear wheels.

This arrangement allows the inboard ends of the suspension/steering arms to be kept close to the centre line of the vehicle and this has significant advantages for the suspension geometry of the steered wheels. Because one set of arms is able to act both as suspension and as steering links and no dedicated steering links are required, considerable complexity reductions can be made.

In one form of the invention, the inboard ends of the suspension arms may be connected to the common actuator which is pivoted at a fixed point on the centreline of the vehicle.

The fact that the actuator is pivoted on a fixed part of the vehicle (or on a chassis sub-frame) has the result that the pivot bearing supports a substantial part of the load which would otherwise be carried directly by the steering mechanism output.

The steering mechanism may be a conventional end take-off steering gear with the take-off shaft being mounted to one or other side of the vehicle centreline and connected to the common actuator through a transfer linkage.

The common actuator may be pivotally mounted on the steering mechanism housing, the housing itself being rigidly mounted to the vehicle body.

The transfer linkage preferably takes the form of a hinged link which is hinged at one end to an arm mounted on the steering mechanism take-off shaft and at the other end to the common actuator.

The steering arms may be connected to the actuator through flexible joints which preferably incorporate rubber bushes.

In another form of the invention, the common actuator is in the form of a slide member which is slidably mounted on a transversely extending body member of the vehicle between the rear wheels, the steering mechanism is arranged to drive the slide member to and fro along the transverse member, and the suspension/steering arms are connected to the slide member so that a steering action is produced as the slide member moves along the transverse member.

The steering mechanism can be a motor (electrical or hydraulic) which is controlled by a control unit which determines the desired steering angle of the rear wheels in accordance with various parameters fed to the unit.

The steering mechanism is preferably connected to the slide member through a linkage which is constructed so that forces acting on the slide member do not cause the motor to be driven.

The slide member is preferably in the form of a saddle which slides on a transverse chassis member. The suspension arms can be connected to the saddle by means of bolts which pass through elongate slots in the chassis member, the elongate slots being arranged so that a limited amount of longitudinal movement is permitted but also so that the saddle is permanently connected to the chassis member.

Such an arrangement has the advantage that it can be constructed using a large number of existing parts and without radical changes to the rear wheel suspension layout. Even if the steering action on the rear wheels is only through a limited angle, this is quite adequate to provide the benefits of rear wheel steering at speeds above manoeuvring speeds.

BRIEF DESCRIPTION OF THE DRAWINGS

The invention will now be further described, by way of example, with reference to the accompanying drawings, in which:

FIG. 1 is a plan view of a rear wheel steering arrangement in accordance with a first embodiment of the invention;

DETAILED DESCRIPTION OF THE PREFERRED EMBODIMENTS

Figure 2:
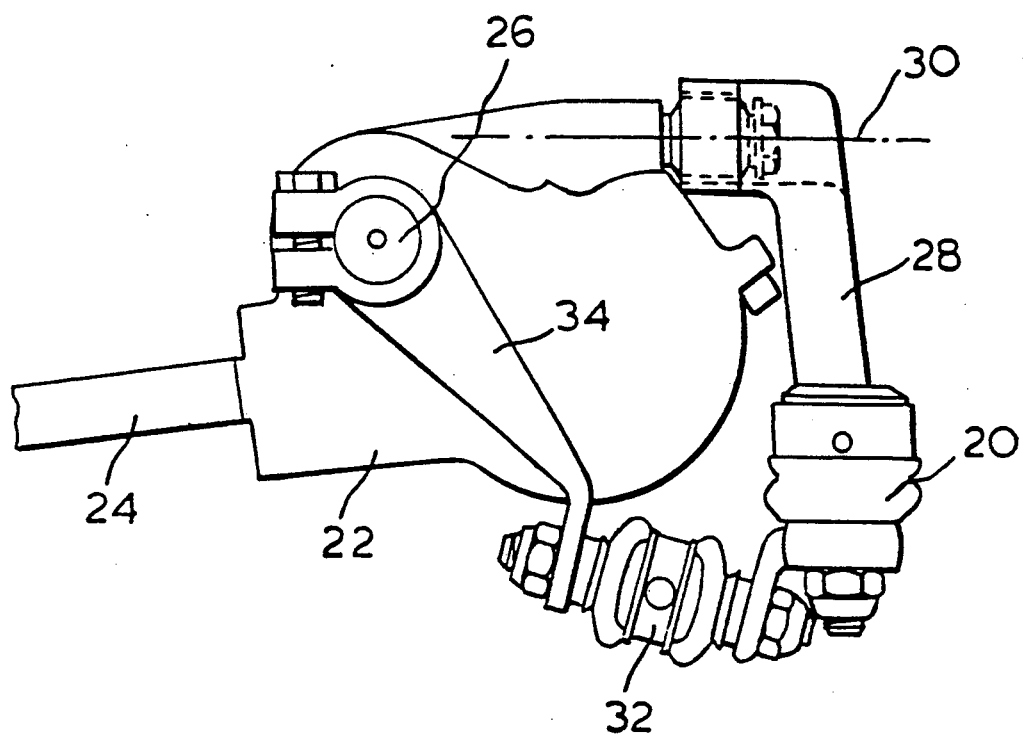
FIG. 2 is a side view of the steering arrangement.

In FIG. 1, the centreline of the vehicle is indicated by a chain-dotted line 10, and a rear wheel as shown at 12. The rear wheel is mounted on a wheel knuckle 14 supported by suspension links 16, 18 and 20. The wheel 12 is a non-driven but steered wheel, and the link 20 also acts as a steering arm 20 connected to the knuckle 14 to transmit steering movement. FIG. 1 shows only one side of the vehicle, and the arrangement shown in FIG. 1 will be repeated substantially symmetrically on the other side of the centreline 10.

In the middle of the vehicle a steering mechanism 22 is mounted and this has an input shaft 24 from the steering wheel at the front of the vehicle. The mechanism 22 also has an output shaft 26.

The steering mechanism is based on a conventional end take-off steering gear as used for conventional front wheel steering systems. To adapt the gear for the rear wheel steering system described here, there may be an arrangement within the housing 22 which converts movement of the input shaft 24 to a movement of the output shaft 26 in accordance with any suitable system for rear wheel steering. For example, the wheels may turn in the opposite sense to the front wheels at low steering angles (which are assumed to occur at high vehicle speeds) and may turn in the same sense at greater steering angles as needed for low speed manoeuvring. Gear arrangements to accomplish this result are in themselves known and form no part of this invention.

Alternatively the adaptation to a rear wheel steering set-up may be carried out by for example an electronically controlled device (not shown) which controls the movement of the output shaft 26.

The suspension links 20, 20a are both pivoted on a common actuator 28 which is secured to the housing 22 at a pivot point 30, and hangs from that pivot point. At the bottom of the actuator, a hinged link 32 connects the actuator to an arm 34 fixed to the output shaft 26. As the output shaft moves linearly, the arm 34 moves with it and the hinged link 32 then causes the actuator 28 to turn in one or other direction about its axis 30. This causes the suspension links 20, 20a to be moved so that the wheel knuckles 14 are turned about the steering axis 34 to effect a steering action.

The connections between the ends of the link 32, the arm 34 and the actuator 28 respectively may all be accomplished through rubber bushed joints which accommodate the relative twisting movement required as a result of the system geometry.

As a result of the fact that the steering arm actuator 28 is mounted on the centreline of the vehicle, the links 20, 20a themselves have a maximum length. This is of great advantage in achieving a suitable suspension geometry for the rear, steered wheels. Furthermore a substantial proportion of the reaction loads imposed on the steering mechanism when the wheels are being steered is supported through the pivot point 30, rather than being transmitted directly to the output shaft 26 of the mechanism.

Figure 4:
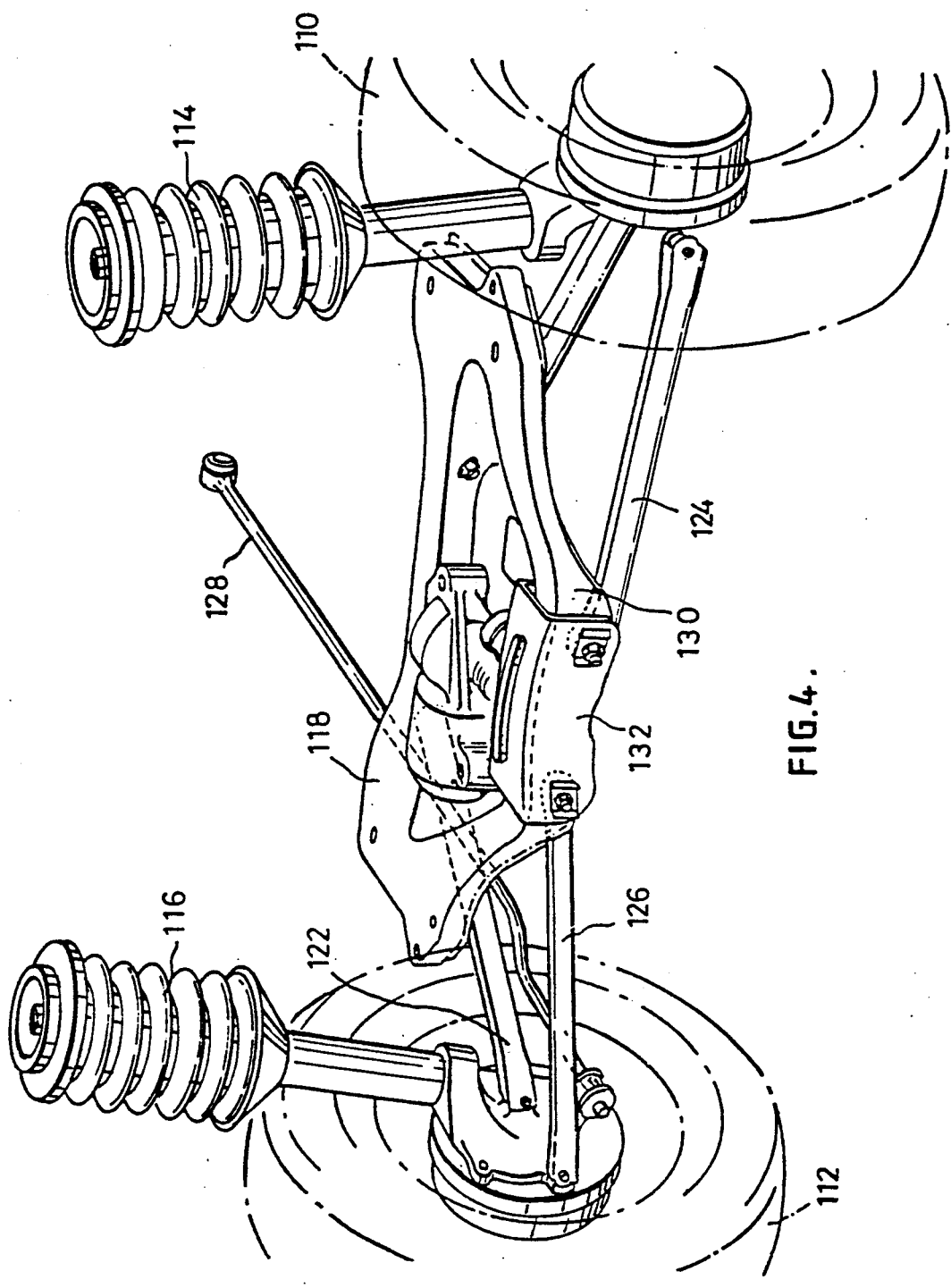
FIG. 4 shows a general arrangement of a back axle with a second embodiment of steering arrangement in accordance with the invention.
Figure 5:
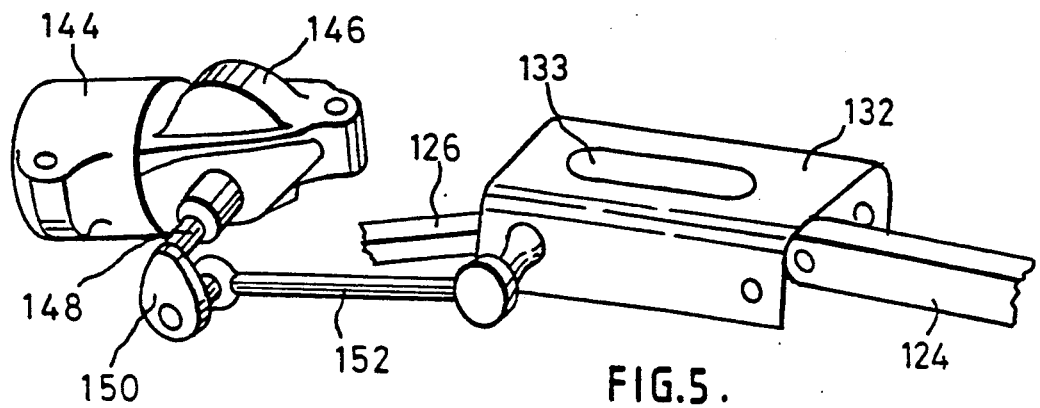
FIG. 5 shows certain components of the arrangement of FIG. 4.

FIG. 4 shows a typical rear wheel arrangement with road wheels 110, 112 supported on suspension struts 114, 116 and linked to a sub frame 118 through suspension links 120, 122, 124, 126. The links 124, 126 also act as steering arms. Longitudinal locating links are provided of which only one is shown in the Figure at 128.

The sub frame 118 is of a substantially conventional construction and has a rear region 130 in the form of a transverse rail.

Figure 3:
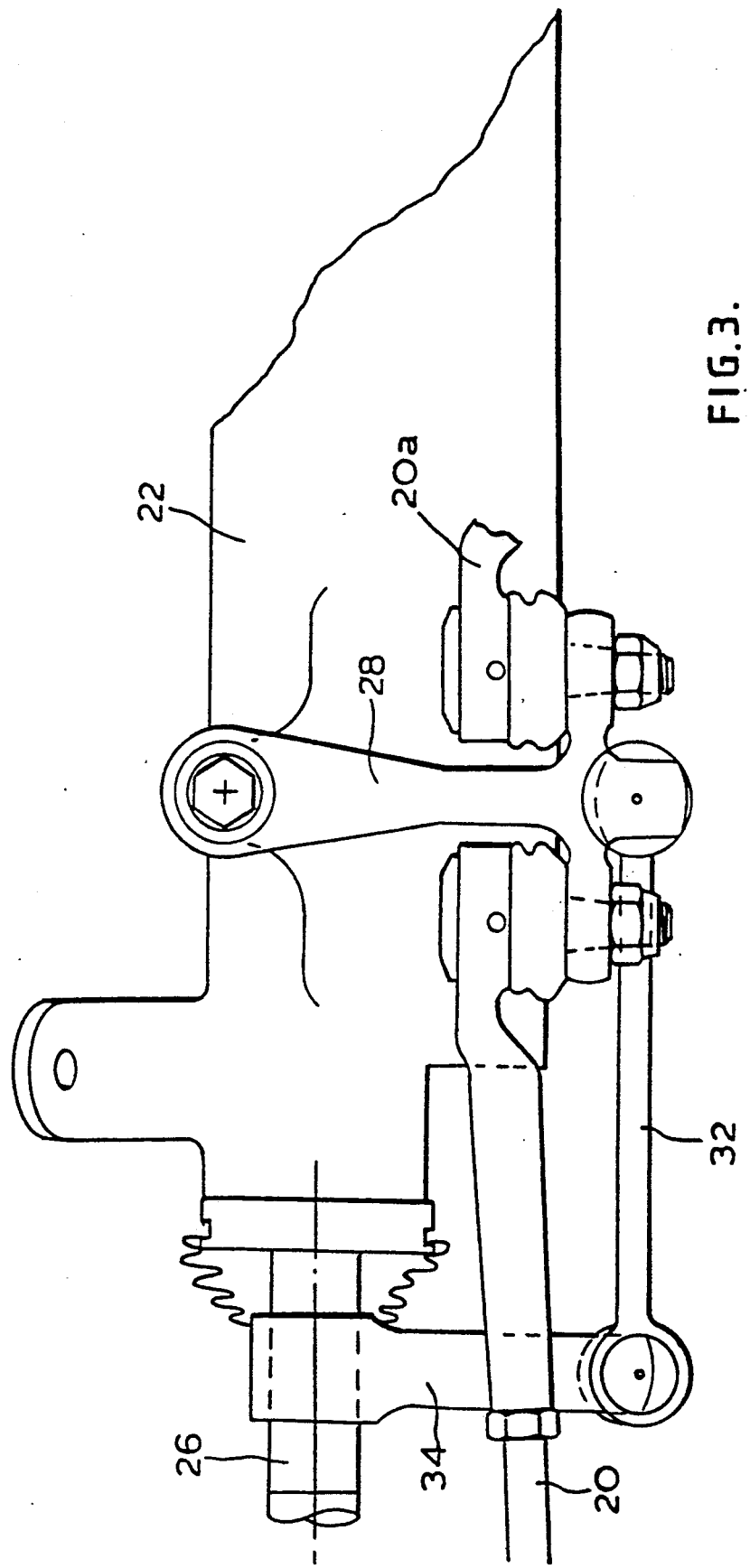
FIG. 3 is an elevation of the arrangement, as seen from the rear of the vehicle.
Figure 6:
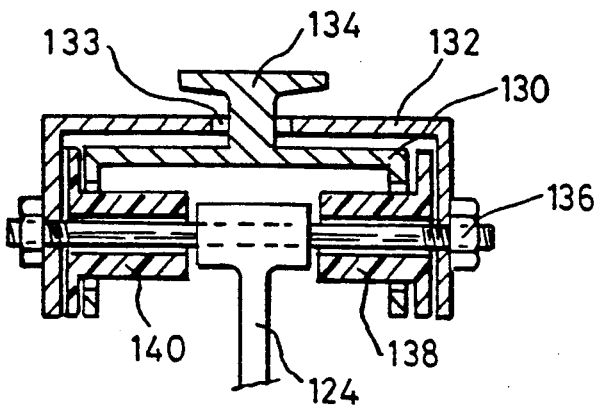
FIG. 6 is a cross section through the saddle and chassis member of FIG. 5.
Figure 7:
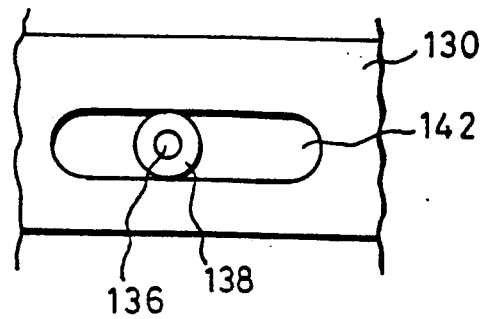
FIG. 7 is a detailed view of part of the assembly shown in FIG. 6.

A saddle 132 fits over the rail and is retained and guided on the rail through a slot 133 on the top face of the saddle which engages with a T-shaped web 134 on the rail. The ends of the suspension links 124, 126 are connected to the saddle in the manner shown in FIG. 3, where a bolt 136 passes through the end of the link 124 and is secured at the two sides of the saddle 132. In FIG. 6 of the drawings, the steering/suspension link 124 is supported centrally in the saddle by two bushings 138, 140, and these bushings together with the bolt 136 pass through elongate slots 142 in the side wall of the rail part 130 of the sub frame 118.

A motor 144 is located close to the saddle 132 and will be secured to a convenient part of the suspension sub-frame or of the vehicle body. Mounting the motor on the sub-frame has considerable advantages in that it enables the sub-frame to become a complete sub-assembly, thus removing any tolerance problems on assembly. The motor may be electrically driven or hydraulically driven and will be caused to operate by receiving a control signal from a control unit which itself receives operating signals from appropriate other parts of the vehicle. The motor 144 shown in the drawings drives a gear contained within a housing 146 which produces a rotating output on a shaft 148. This causes a crank 150 to move a link arm 152 backwards and forwards, and the link arm 152 is connected directly to the saddle 132. In fact only a very small amount of movement is necessary to produce an effective rear wheel steering action when the vehicle is at speed. All that is needed under these conditions is up to two degrees of steering movement of the wheels, and this can be achieved by allowing the saddle 132 to move typically ±5 mm from a centre position.

The construction shown in FIGS. 4 to 7 shows the saddle 132 guided on the chassis member 130 by the location of the bushes 138 in the slots 142. This type of guiding may be adequate for very small steering angles, but a full slide guide mechanism can be used to allow greater steering angles to be used.

Figure 8:
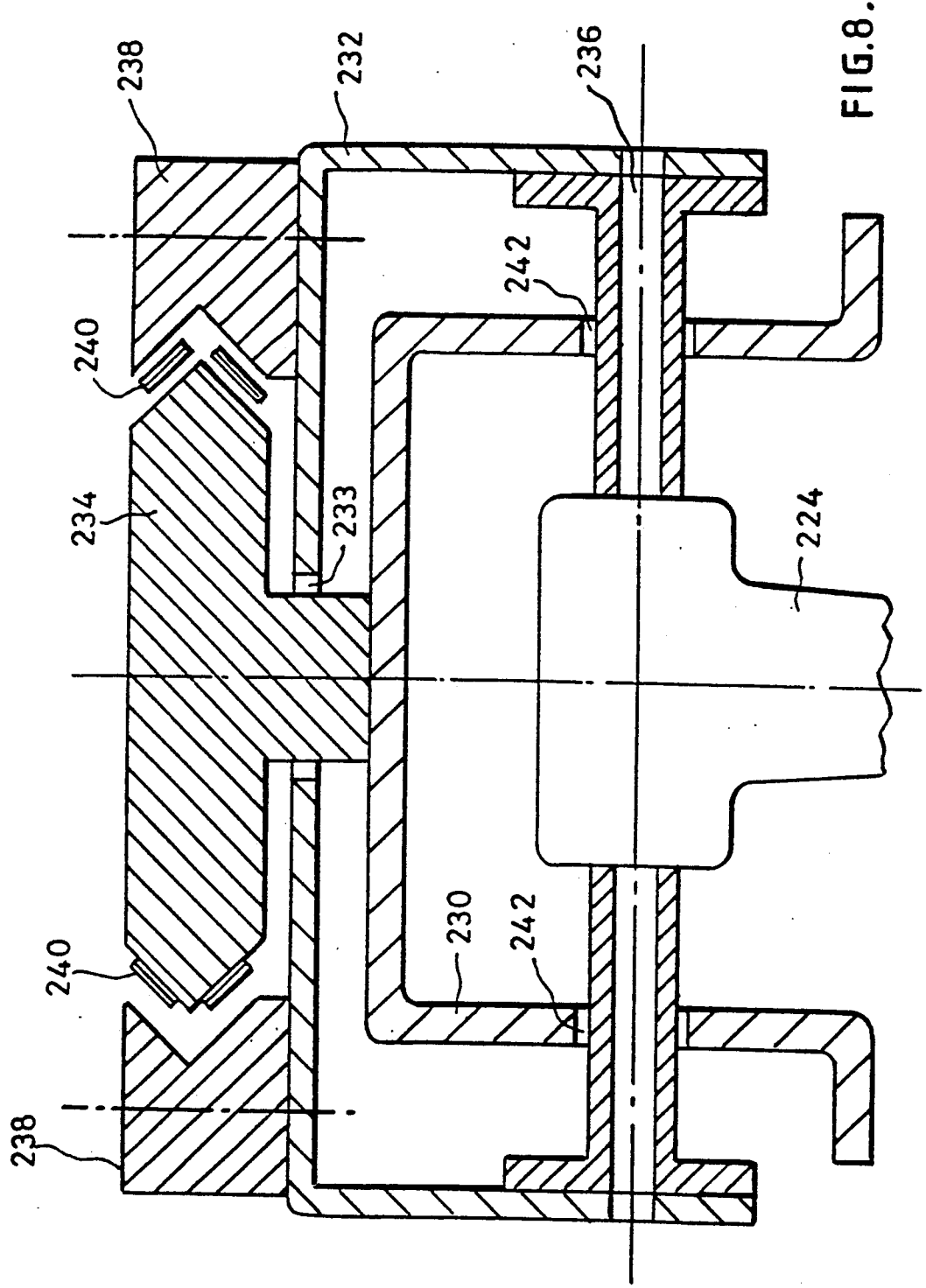
FIG. 8 is a cross-section corresponding to the section of FIG. 6 but showing an alternative bearing arrangement.

FIG. 8 shows a construction where the saddle 232 has upper guide shoes 238 which run on needle bearings 240 mounted on the V-shaped guide edges of the web 234. A bolt 236 which supports the suspension/steering link 224 is a clearance fit in slots 242 in the chassis member 230.

Figure 9:
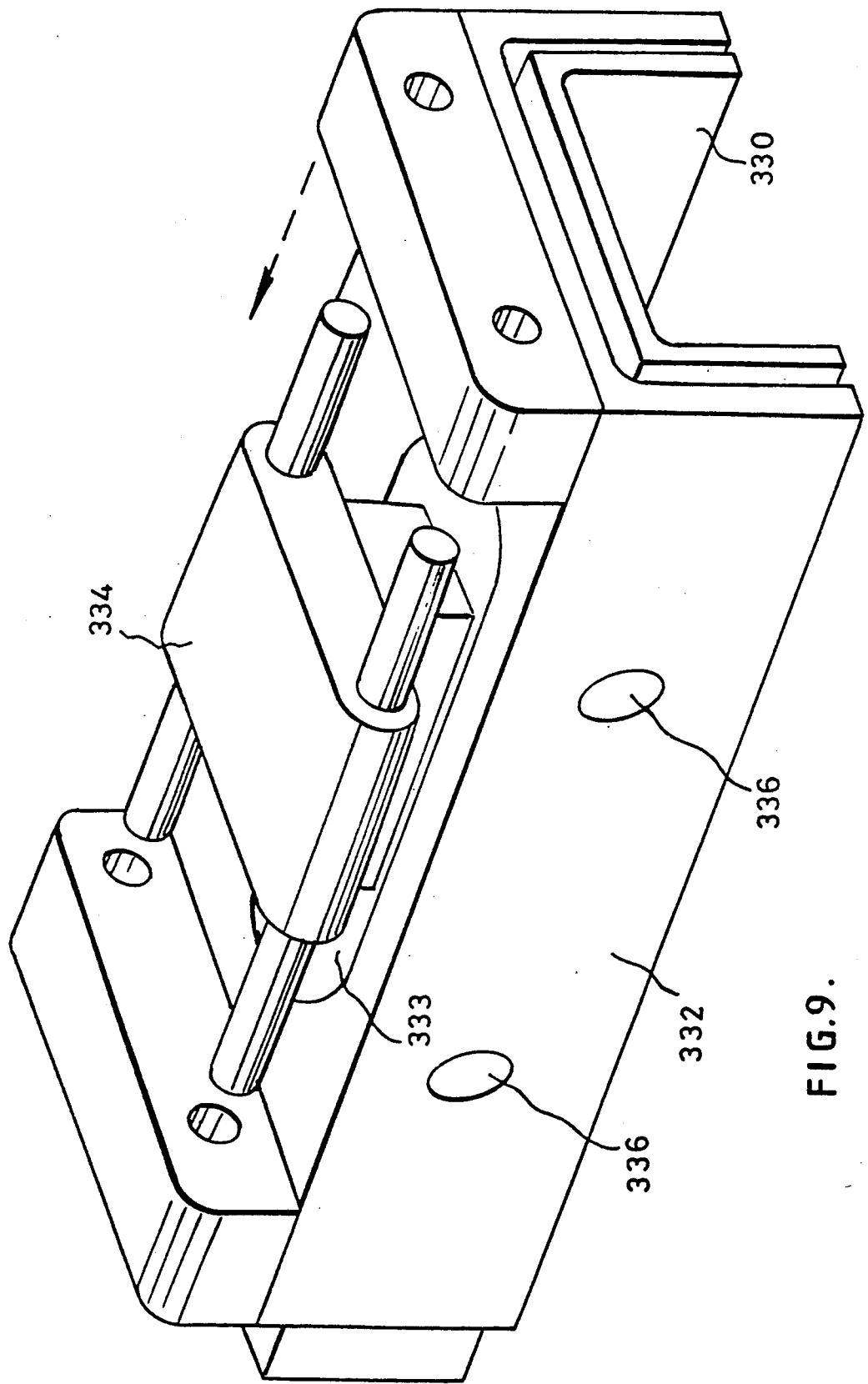
FIG. 9 is an exploded perspective view of the saddle and chassis member in another alternative arrangement, viewed from above.

In FIG. 9, the web 334 carries axially extending guide rods 335 (which are shown foreshortened in the drawing), and guide shoes 338 are mounted on the top of the saddle with bearing bores 337 through them to receive the rods 335. In other respects, the embodiments of FIGS. 8 and 9 have features similar to the embodiments described earlier.

The construction of the motor and the mechanism through which the motor drive is transferred to the saddle will be arranged so that forces acting up the links through the saddle to the motor do not cause rotation of the motor. By suitably arranging this mechanism, such as in the form of a worm drive, the size of the motor and hence its power consumption can be minimised.

With the arrangement shown, it is possible to use the same basic suspension geometry for both two wheel steering and four wheel steering derivatives of the same basic vehicle as the links, bushings and line assembly procedures can be the same for both.

We claim:

1. A rear wheel steering arrangement for a motor vehicle having a pair of rear wheels each connected to the vehicle by a forward and a rearward transverse suspension arm, the arrangement comprising:
 a body member extending transversely between each of said rear wheels;
 a slide member mounted on said transversely extending body member and being connected to an inboard end of each of said rearward suspension arms; and
 a steering mechanism having an input shaft and an output shaft, said output shaft being connected to said slide member, said steering mechanism being operative to drive said slide member axially along said transverse member about a centerline of the vehicle, causing said rearward suspension arms to move in common with said slide member so as to produce a steering action on said rear wheels.

2. A rear wheel steering arrangement as claimed in claim 1, wherein said steering mechanism includes a take-off shaft being mounted to one or other side of the vehicle centerline and connected to the slide member through a transfer linkage.

3. A rear wheel steering arrangement as claimed in claim 2, wherein the transfer linkage takes the form of a hinged link which is hinged at one end to an arm mounted on the steering mechanism take-off shaft and at the other end to the slide member.

4. A rear wheel steering arrangement as claimed in claim 2 wherein the suspension arms which are connected to the steering mechanism are connected to the slide member through flexible joints which incorporate rubber bushes.

5. A rear wheel steering arrangement as claimed in claim 1 wherein the steering mechanism is a motor which is controlled by a control unit which determines the desired steering angle of the rear wheels in accordance with various parameters fed to the unit.

6. A rear wheel steering arrangement as claimed in claim 5, wherein said motor is an electrical motor.

7. A rear wheel steering arrangement as claimed in claim 5, wherein said motor is hydraulically operated.

8. A rear wheel steering arrangement as claimed in claim 1 wherein the steering mechanism is connected to the slide member through a linkage which is constructed so that forces acting on the slide member do not cause the motor to be driven.

9. A rear wheel steering arrangement as claimed in claim 1 wherein the slide member is in the form of a saddle which slides on a transverse chassis member.

10. A rear wheel steering arrangement as claimed in claim 9, wherein the suspension arms are connected to the saddle by means of blots which pass through elongate slots in the chassis member, the elongate slots being arranged so that a limited amount of longitudinal movement is permitted but also so that the saddle is permanently connected to the chassis member.

11. A rear wheel steering arrangement as claimed in claim 9, wherein said transversely extending body member includes a T-shaped web projecting therefrom, said web being operative to engage a slot disposed in said saddle.

12. A rear wheel steering arrangement as claimed in claim 1, wherein said saddle includes a pair of upper guide shoes secured thereto, said guide shoes being operative to engage said web.

13. A rear wheel steering arrangement as claimed in claim 11, wherein said saddle includes a pair of upper guide shoes secured thereto, said guide shoes including bearing bores therethrough which receive axially extending rods connected to said web, so that said saddle is operative to reciprocate axially along said rods.

* * * * *